(12) United States Patent
Lang et al.

(10) Patent No.: US 9,512,004 B2
(45) Date of Patent: Dec. 6, 2016

(54) METHOD FOR OPERATING A STEAM REFORMING PLANT

(71) Applicants: Martin Lang, Munich (DE);
Alexander Hirsch, Schondorf (DE);
Josef Schwarzhuber, Wolnzach (DE)

(72) Inventors: Martin Lang, Munich (DE);
Alexander Hirsch, Schondorf (DE);
Josef Schwarzhuber, Wolnzach (DE)

(73) Assignee: Linde Aktiengesellschaft, Munich (DE)

( * ) Notice: Subject to any disclaimer, the term of this patent is extended or adjusted under 35 U.S.C. 154(b) by 27 days.

(21) Appl. No.: 14/629,978

(22) Filed: Feb. 24, 2015

(65) Prior Publication Data

US 2015/0251906 A1 Sep. 10, 2015

(30) Foreign Application Priority Data

Mar. 6, 2014 (DE) ........................ 10 2014 003 392

(51) Int. Cl.
*C01B 3/38* (2006.01)
*C01B 3/34* (2006.01)
(Continued)

(52) U.S. Cl.
CPC .............. *C01B 3/34* (2013.01); *B01J 19/0006* (2013.01); *B01J 19/24* (2013.01); *C01B 3/384* (2013.01); *C01B 3/50* (2013.01); *C01B 3/56* (2013.01); *B01J 2219/00006* (2013.01); *B01J 2219/00049* (2013.01); *B01J 2219/24* (2013.01); *C01B 2203/0216* (2013.01); *C01B 2203/0233* (2013.01); *C01B 2203/042* (2013.01); *C01B 2203/043* (2013.01); *C01B 2203/046* (2013.01); *C01B 2203/047* (2013.01); *C01B 2203/0415* (2013.01); *C01B 2203/0475* (2013.01); *C01B 2203/0495* (2013.01); *C01B 2203/0811* (2013.01); *C01B 2203/1235* (2013.01); *C01B 2203/1241* (2013.01);
(Continued)

(58) Field of Classification Search
USPC ........................................................ 252/373
See application file for complete search history.

(56) References Cited

U.S. PATENT DOCUMENTS 4,963,339 A * 10/1990 Krishnamurthy .... B01D 53/047
422/198
5,256,172 A * 10/1993 Keefer ................. B01D 53/047
423/220

(Continued)

*Primary Examiner* — Melvin C Mayes
*Assistant Examiner* — Kenneth Vaden
(74) *Attorney, Agent, or Firm* — David A. Hey, Esq.

(57) ABSTRACT

A method for operating a steam reforming plant wherein a hydrocarbon-rich feed is reacted with steam to form synthesis gas. The plant includes a steam reforming reactor and processing units to obtain a hydrogen-rich fraction after separation of carbon dioxide and carbon monoxide. The plant also includes a pressure-swing adsorption plant to separate the hydrogen-rich fraction into product and residual gas. A recycle compressor is included and allows the plant to operate is two different modes. In the first mode, carbon dioxide separated from the synthesis gas is compressed and added to the hydrocarbon-rich feed. In the second mode, the recycle compressor is used to recycle residual gas from the pressure-swing adsorption plant to the hydrogen-rich fraction upstream of the pressure-swing adsorption plant.

5 Claims, 2 Drawing Sheets

(51) Int. Cl.
*B01J 19/00* (2006.01)
*B01J 19/24* (2006.01)
*C01B 3/50* (2006.01)
*C01B 3/56* (2006.01)

(52) U.S. Cl.
CPC ............ *C01B 2203/1258* (2013.01); *C01B 2203/1276* (2013.01); *C01B 2203/147* (2013.01); *C01B 2203/148* (2013.01); *C01B 2203/16* (2013.01); *C01B 2203/169* (2013.01)

(56) References Cited

U.S. PATENT DOCUMENTS

2009/0012188 A1* 1/2009 Rojey ................. C01B 3/36 518/700
2013/0156686 A1* 6/2013 Vauk ................. C01B 3/384 423/652

* cited by examiner

METHOD FOR OPERATING A STEAM REFORMING PLANT

FIELD OF THE INVENTION

The present invention relates for operating a steam reforming plant, and to a steam reforming plant which is equipped for corresponding operation.

BACKGROUND OF THE INVENTION

Steam reforming is the most widely used method for generating synthesis gas from light hydrocarbons. In steam reforming, a hydrocarbon feed such as natural gas, liquid gas or naphtha is endothermically reacted with steam in a catalytic tubular reactor, hereinafter called "steam reforming reactor", to form synthesis gas. Process heat and flue gas heat are utilized for steam generation. Details of such a system may be found, for example, in Chapter 2 of the article "Gas Production" in Ullmann's Encyclopedia of Industrial Chemistry (doi:10.1002/14356007.a12_169.pub2, electronic edition 2007).

First, superheated process steam is added to the purified, in particular, desulphurized, hydrocarbon feed in accordance with the steam/carbon ratio required for the reforming reactions. Then the hydrocarbon/steam mixture obtained is heated and distributed over the catalyst-filled and externally-fired tubes of the steam reforming reactor. When the mixture flows through the tubes, it reacts in accordance with the following reactions:

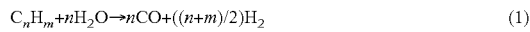

$$C_nH_m + nH_2O \rightarrow nCO + ((n+m)/2)H_2 \quad (1)$$

$$CH_4 + H_2O \leftrightarrow CO + 3H_2 \quad (2)$$

$$CO + H_2O \leftrightarrow CO_2 + H_2 \quad (3)$$

In order to minimize the methane content in the synthesis gas, maximize the hydrogen yield and avoid the formation of elemental carbon and deposition thereof on the catalyst, the steam reforming reactor is operated at a higher steam/carbon ratio than is theoretically required.

For purposes of the following description, the materials and mixtures described, for example a hydrocarbon feed or a synthesis gas, are referred to a "streams" or "fractions". A stream normally describes a fluid flowing through a conduit, whereas a fraction designates a portion of a starting mixture separated from the starting mixture.

A stream or a fraction can be described as "rich" or "lean" in one or more components, e.g. hydrogen, wherein "rich" is generally a portion more than 75% and "lean" a portion less than 25% in each case based on a weight or volume basis.

The steam reforming process is generally followed by a plurality of workup steps which serve for obtaining pure end products from the synthesis gas. The synthesis gas is first cooled followed by a step of removing carbon dioxide in a carbon dioxide separation unit, wherein some of the carbon dioxide is scrubbed out, for example with methanol and/or diethanolamine. Carbon dioxide can also be removed, for example, by subsequent temperature-swing adsorption. A cryogenic separation of the synthesis gas is performed to provide a hydrogen-rich fraction and a carbon monoxide-rich fraction, with the latter being compressed and delivered to the battery limit.

The hydrogen-rich fraction resulting from the cryogenic separation, still contains impurities such as carbon monoxide, carbon dioxide and light hydrocarbons, such as methane, ethane, propane, ethylene and propylene. These impurities are separated in a pressure-swing adsorption plant, obtaining residual gas or tail gas, and the hydrogen product, preferably pure hydrogen from the hydrogen-rich fraction.

Since the heat balance for the main reactions (1)-(3) cited above is endothermic, the heat required must be supplied by external firing. Fuel gas for this firing can be supplied from the residual gas of the pressure-swing adsorption plant, and from also heating gas from beyond the battery limit.

The effect of various parameters on the composition of the synthesis gas are summarized in WO 2005/040704 A2 and known methods are disclosed in WO 03/086965 A1, EP 1 544 166 A2 and EP 0 790 212 A1.

Depending on the desired hydrogen/carbon monoxide quantitative product ratio in the synthesis gas, a carbon dioxide fraction from the carbon dioxide separation unit can be recycled via a recycle compressor and added to the hydrogen feed. In a plant having a natural gas feed, with complete recycling of the carbon dioxide fraction that is separated, and depending on further boundary conditions, a hydrogen/carbon monoxide quantitative product ratio of approximately 2.5 can be obtained. If less hydrogen is required, carbon dioxide can be imported from beyond the battery limit, in order to decrease the hydrogen/carbon monoxide quantitative product ratio.

If a higher hydrogen/carbon monoxide quantitative product ratio is desired, the recycling of the carbon dioxide fraction can be reduced to zero. This results in the hydrogen/carbon monoxide quantitative product ratio increasing to approximately 4.1. If more hydrogen is to be produced, the plant can be operated using different parameters (e.g. higher steam fraction) but this has a direct effect on plant size and therefore capital costs. As an alternative, a side stream shift or a separate shift line can be installed, but this also leads to an increase in the capital costs.

There remains a need in the art for improvements to the production of hydrogen-rich synthesis gas using a stream reforming reactor without an appreciable increase in capital costs.

SUMMARY OF THE INVENTION

The invention provides a method for operating a steam reforming plant in two separate modes, a first using the recycle compressor to recycle carbon dioxide from the synthesis gas separation, and a second using the recycle compressor to add residual gas from the pressure-swing adsorption to the hydrogen-rich stream. The invention also provides a steam reforming plant equipped to operate in the manner described.

DETAILED DESCRIPTION OF THE INVENTION

Figure 1:
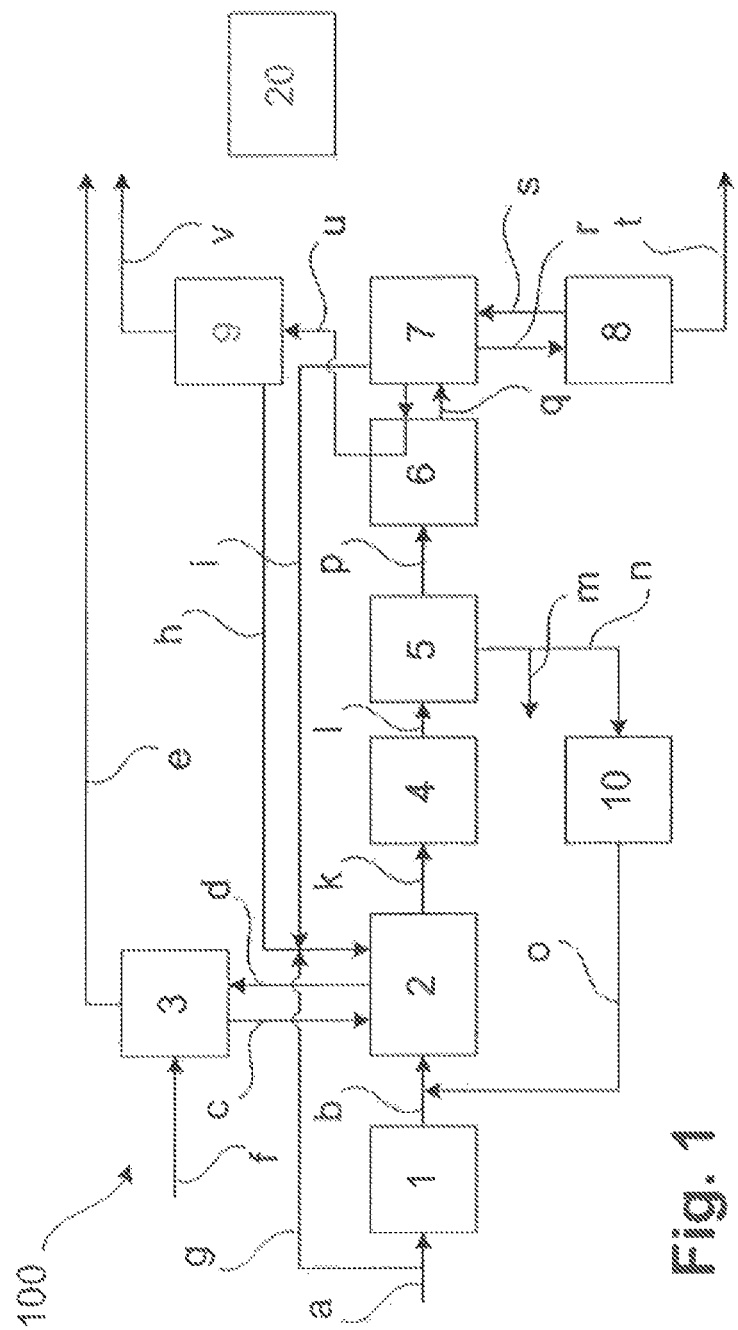
FIG. 1 is a schematic diagram of a steam reforming plant according to the invention operating in a first mode.

The invention provides a method for operating a steam reforming plant wherein a hydrocarbon-rich feed is reacted with steam to form a synthesis gas using at least one steam reforming reactor. The synthesis gas is processed in at least one processing unit to produce a hydrogen-rich fraction by separating carbon dioxide and carbon monoxide from the synthesis gas. The hydrogen-rich fraction is further processed in at least one pressure-swing adsorption plant to produce a residual gas. As noted above, in a first mode of operation, at least some of the carbon dioxide separated from the synthesis gas can be recycled using a recycle compressor to compress the carbon dioxide and return it to the hydrocarbon-rich feed. The carbon dioxide separated from the synthesis gas can be withdrawn from a carbon dioxide separator, e.g. a carbon dioxide scrubber according to known methods, such as that described in WO 2005/040704 A2.

According to the invention, a second mode of operation is carried out, wherein the recycle compressor is not used for compression of carbon dioxide that is separated from the synthesis gas. Rather, the recycle compressor is used to add at least part of the residual gas separated in the pressure-swing adsorption plant to the hydrogen-rich fraction upstream of the pressure-swing adsorption plant.

According to the invention, in the first mode of operation, the recycle compressor is used in the standard manner to add carbon dioxide separated from the synthesis gas to the hydrocarbon-rich feed in order to achieve a low hydrogen/carbon monoxide quantitative product ratio. When a high hydrogen/carbon monoxide quantitative product ratio is sought, then the second mode of operation according to the invention is performed. In this second mode, the recycling of the carbon dioxide fraction is reduced to zero and the recycle compressor is instead used to recycle a part of the residual gas from the pressure-swing adsorption plant into the hydrogen-rich fraction upstream of the pressure-swing adsorption plant. This second mode of operation increases the hydrogen yield. The pressure-swing adsorption plant typically achieves a hydrogen yield of approximately 90%. The remaining 10% of hydrogen is released in the residual gas. By Therefore, by recycling at least a part of the residual gas and feeding it in upstream of the pressure-swing adsorption plant, approximately 90% of the hydrogen present in the residual gas passes into the hydrogen product, and so increases the hydrogen yield correspondingly.

The method according to the invention enables the hydrogen/carbon monoxide quantitative product ratio of the synthesis gas produced in the steam reforming plant to be increased by simple and inexpensive measures. It is possible to dispense with the commonly employed shift, i.e. an additional plant that carries out a carbon monoxide or water gas shift reaction, of at least a part of the carbon monoxide present in the synthesis gas. Further, a conventionally required strong increase in the steam proportion in the steam reforming reactor, which requires additional energy, is not necessary. Therefore, the maximum hydrogen yield of a plant using the method of the invention can be increased without significant increase in capital costs.

By virtue of the invention, it is possible to significantly increase the hydrogen/carbon monoxide quantitative product ratio without having to increase the size of the plant. When natural gas is used as hydrocarbon-rich feed, the ratio can be increased to approximately 4.8. This corresponds to a yield increase of approximately 5-10%, which means that either a larger amount of a hydrogen product can be withdrawn from the plant or the plant load can be correspondingly reduced. In other words, when using the invention, a constant amount of the hydrogen-rich fraction fed into the pressure-swing adsorption plant (a constant amount of the carbon monoxide product is produced), the amount of the hydrogen product produced is increased over what can be produced by conventional methods. If this increase is not desired, for example because of the increase of the hydrogen/carbon monoxide quantitative product ratio, then the corresponding reduction of the carbon monoxide product obtained by the method of the invention allows for a reduction of throughput and therefore lower costs.

Depending on the desired hydrogen/carbon monoxide quantitative product ratio, the invention allows the plant to be run in either the first or second mode of operation. The invention also provides a method that is therefore easily adaptable to meet desired product requirements.

Operation in the second mode according to the invention, i.e. feeding the separated residual gas into the hydrogen-rich fraction upstream of the pressure-swing adsorption plant, is selected when the desired hydrogen/carbon monoxide quantitative product ratio is at least 4.0. Values this high or higher, can only be achieved in conventional plants by enlarging the plant at considerable additional expenditure.

The hydrogen-rich fraction fed into the pressure-swing adsorption plant typically has a hydrogen content of at least 85 mol %, and in many cases at least 95 mol %. The tail gas or residual gas from the pressure-swing adsorption plant typically has at least 2 to 50 mol % carbon monoxide, 0 to 5 mol % carbon dioxide, 30 to 90 mol % hydrogen and 0 to 20 mol % light hydrocarbons. These values depend greatly on the respective configuration of a carbon monoxide separation unit used.

When natural gas is used as the hydrocarbon-rich feed, the hydrogen/carbon monoxide quantitative product ratio obtained is particularly high. This is because natural gas is principally made up of methane that has a favourable hydrogen/carbon ratio of 4 to 1, thereby producing a particularly high yield of hydrogen. Other feeds having varying contents of light, gaseous hydrocarbons can also be used.

The steam reforming plant according to the invention is equipped for carrying the method of the invention. The plant includes at least one steam reforming reactor for reacting a hydrocarbon-rich feed with steam to form a synthesis gas, at least one processing unit for obtaining a hydrogen-rich fraction from the synthesis gas by separating carbon dioxide and carbon monoxide, and at least one pressure-swing adsorption plant for separating a residual gas from the hydrogen-rich fraction. The plant also includes at least one recycle compressor that allows the plant to operate in either the first or second mode as described. In the first mode of operation, the recycle compressor is connected to the processing unit and also to the intake side of the steam reformer so that carbon dioxide separated from the synthesis gas can be added at least in part to the hydrocarbon-rich feed. In the second mode of operation, the recycle compressor is connected to the processing unit and the pressure-swing adsorption plant so that residual gas separated in the pressure-swing adsorption plant can be added at least in part to the hydrogen-rich fraction upstream of the pressure-swing adsorption plant.

The steam reforming plant of the invention advantageously includes at least one control unit for switching the steam reforming plant between the first mode of operation and the second mode of operation. This control unit can be fully automatic based on a user presetting making the plant particularly simple to operate.

The processing unit of the plant according to the invention preferably includes at least one carbon dioxide separation unit, at least one temperature-swing adsorption plant and at least one cryogenic separation unit.

The invention will be further described with reference to the drawing figures wherein like components are give like reference characters.

FIG. 1 is a schematic diagram of a steam reforming plant 100 in the first mode of operation. A hydrocarbon-rich feed is provided to the plant 100 via conduit a. The hydrocarbon-rich feed may be purified in a purification unit 1, such as a desulphurization unit. The purified hydrocarbon-rich feed is fed through conduit b to a steam reforming reactor 2 for reacting with steam that is fed from a steam system 3 via conduit c, to form a synthesis gas. Condensate from the steam reforming reactor 2 and a subsequent cooling unit 4 can be recirculated via conduit d into the steam system 3. The steam system 3 can also export steam via conduit e and is fed via conduit f with preferably demineralized water. The steam reforming reactor 2 can be fired with a portion of the hydrocarbon-rich feed branched off upstream of the purification unit 1 via conduit g. Further combustible fuel gas can be provided via conduits h and i as more fully explained below.

Synthesis gas from the steam reforming reactor 2 is fed to the cooling appliance 4 via conduit k and is then fed via conduit l to a carbon dioxide separator 5. A first part of the carbon dioxide present in the synthesis gas is scrubbed out, for example with methanol or diethanolamine and the resulting carbon released to the atmosphere via conduit m or delivered to other units for further processing. In particular, the carbon dioxide may be fed at least in part via conduit n to a recycle compressor 10 when the plant is in the first mode of operation. The carbon dioxide is compressed in the recycle compressor 10 and then added via conduit o at least in part to the hydrocarbon-rich feed in the conduit b. As a result, the hydrogen/carbon monoxide quantitative ratio in the synthesis gas and hydrogen/carbon monoxide quantitative product ratio can be decreased.

The synthesis gas from the carbon dioxide separator 5 is fed via conduit p into a temperature-swing adsorption plant 6 that separates the residual carbon dioxide from the synthesis gas. The further processed synthesis gas is fed via conduit q to a cryogenic separation unit 7 that produces a hydrogen-rich fraction and a carbon monoxide-rich fraction using known technology.

The combination of the cooling unit 4, the carbon dioxide separator 5, the temperature-swing adsorption plant 6 and the cryogenic separation unit 7 provide a hydrogen-rich fraction from the synthesis gas by separating carbon dioxide and carbon monoxide from the feed gas. The carbon monoxide-rich fraction from the cryogenic separation unit 7 is fed into a carbon monoxide compressor 8 via conduit r. Part of the compressed gas is fed back to the cryogenic separation unit 7 via conduit s and the rest is delivered as via conduit t to the battery limit as product.

The hydrogen-rich fraction from the cryogenic separation unit 7 is fed via conduit u into a pressure-swing adsorption plant 9 and further purified. Hydrogen product that is obtained in the pressure-swing adsorption plant 9 is delivered via conduit v to the battery limit. Tail gas or residual gas from the pressure-swing adsorption plant 9 can be used for firing the steam reforming reactor 2 via the conduit h. A portion of the hydrogen-rich fraction can also be delivered as fuel gas (a mixture of light hydrocarbons) to the cryogenic separation unit 7 via conduit i. This portion is branched off prior to treatment in the pressure swing adsorption plant 9.

Figure 2:
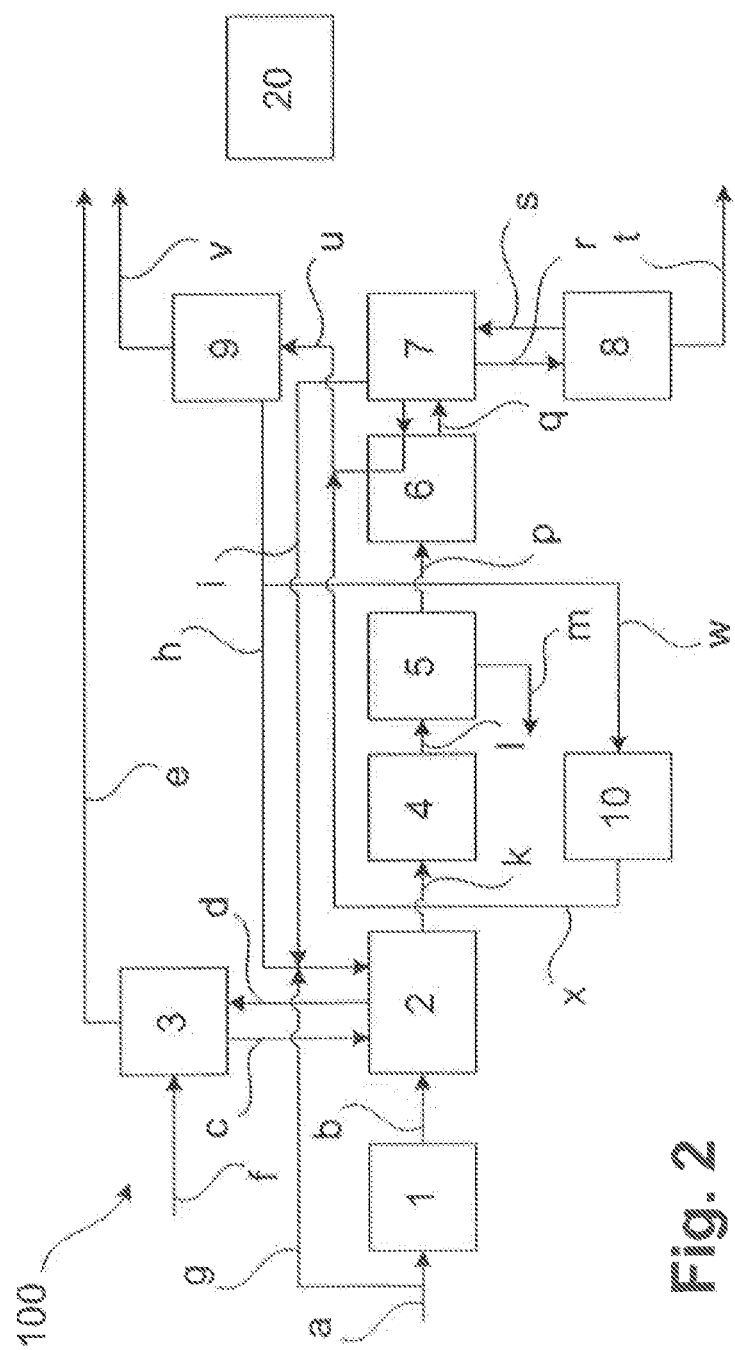
FIG. 2 is a schematic diagram of a steam reforming plant according to the invention operating in a second mode.

FIG. 2 is a schematic diagram of the steam reforming plant 100 in the second mode of operation. In the second mode of operation, the residual gas that is separated in the pressure-swing adsorption plant 9 is added at least in part to the hydrogen-rich fraction upstream of the pressure-swing adsorption plant 9 using the recycle compressor 10. The conduits w and x are used for this purpose. The carbon dioxide that is separated from the synthesis gas continues to be released via the conduit m, but is no longer added to the feed. The conduit h may be used at least intermittently, since only a part of the residual gas (e.g. 50%) is recirculated upstream of the pressure-swing adsorption plant 9 to avoid accumulation of impurities. The remainder continues to be fired in the steam reforming reactor 2.

Both FIGS. 1 and 2 also include a control unit 20 for switching the steam-reforming plant 100 between the first mode of operation to the second mode of operation.

It will be understood that the embodiments described herein are merely exemplary and that one skilled in the art may make variations and modifications without departing from the spirit and scope of the present invention. All such variations and modifications are intended to be included within the scope of the invention as described above. Further, all embodiments disclosed are not necessarily in the alternative, as various embodiments of the invention may be combined to provide the desired result.

What is claimed is:

1. A method for producing synthesis gas having different hydrogen/carbon monoxide quantitative product ratios in a steam reforming plant, the steam reforming plant comprising:
   at least one steam reforming reactor;
   at least one processing unit;
   at least one pressure-swing adsorption plant; and
   at least one recycle compressor;
   wherein the method comprises:
   reacting a hydrocarbon-rich feed with steam in the at least one steam reforming reactor to form synthesis gas;
   separating carbon dioxide and carbon monoxide from the synthesis gas in the at least one processing unit to form a hydrogen-rich fraction;
   separating a residual gas from the hydrogen-rich fraction in the at least one pressure-swing adsorption plant;
   producing synthesis gas having a hydrogen/carbon monoxide quantitative product ratio of less than 4 by recycling at least a part of the carbon dioxide separated from the synthesis gas to the hydrocarbon-rich feed using the at least one recycle compressor; and
   producing synthesis gas having a hydrogen/carbon monoxide quantitative product ratio of 4 or higher by recycling at least a part of the residual gas separated from the hydrogen-rich fraction to the hydrogen-rich fraction upstream of the at least one pressure-swing adsorption plant using the at least one recycle compressor.

2. The method according to claim 1, wherein the hydrogen-rich fraction has a hydrogen content of at least 85 mol %.

3. The method according to claim 2, wherein the hydrogen-rich fraction has a hydrogen content of at least 95 mol %.

4. The method according to claim 1, wherein the residual gas has at least 2 to 50 mol % carbon monoxide, 0 to 5 mol % carbon dioxide, 30 to 90 mol % hydrogen and 0 to 20 mol % light hydrocarbons.

5. The method according to claim 1, wherein the hydrocarbon-rich feed is natural gas.

* * * * *